July 6, 1954   H. G. CAMNER   2,682,862
INTERNAL-COMBUSTION ENGINE WITH OPEN COMPRESSION CHAMBER
Filed June 23, 1948   2 Sheets-Sheet 1

Inventor
Hilding Gunnar Camner
by Jarvis C. Marble
his attorney

July 6, 1954     H. G. CAMNER     2,682,862
INTERNAL-COMBUSTION ENGINE WITH OPEN COMPRESSION CHAMBER
Filed June 23, 1948     2 Sheets-Sheet 2

Patented July 6, 1954

2,682,862

UNITED STATES PATENT OFFICE 2,682,862

INTERNAL-COMBUSTION ENGINE WITH OPEN COMPRESSION CHAMBER

Hilding Gunnar Camner, Storangen, Sweden, assignor to Aktiebolaget Atlas Diesel, Sickla, near Stockholm, Sweden, a corporation of Sweden Application June 23, 1948, Serial No. 34,725

8 Claims. (Cl. 123—32)

1

This invention relates to internal combustion engines having an open compression chamber defined between an engine piston and a further part of the engine and provided with means for fuel injection substantially centrally of an arcuate inclined wall formed on said piston and inclined relative to the direction of the fuel injection, and in which engines the piston and said further part, when the piston is at one end of its stroke, form a narrow slot disposed beyond said wall in the direction of the fuel injection in such a manner that the elongation of said slot extends over the arcuate wall through the compression chamber. The invention is principally characterized by the features that a surface on the piston, which forms one side surface of the slot and the said arcuate wall form an arcuate ridge on the piston, and that the further part of the engine is provided with a cavity disposed beyond said ridge in the direction of the fuel injection and forming a space extending beyond said ridge in the direction of the fuel injection through which fuel jets are thrown by the arcuate wall on the piston. The result of the invention is that fuel jets at least during a portion of the injection period are thrown against the arcuate wall of the engine piston and are thereby spread in fan-shape over a large portion of the compression chamber which when the engine piston approaches top dead centre is crossed by air streams from the slot formed between the engine piston and the further part of the engine. Said part may consist of the cylinder head of the engine, or of an opposed motion of an opposed piston engine, or the like. The invention results in a very even distribution of the fuel in the air mass in the compression chamber, and, simultaneously, a very good mixture of fuel and air is obtained so that a very complete combustion is achieved and the available air is utilized as far as possible for the combustion.

Figure 1:
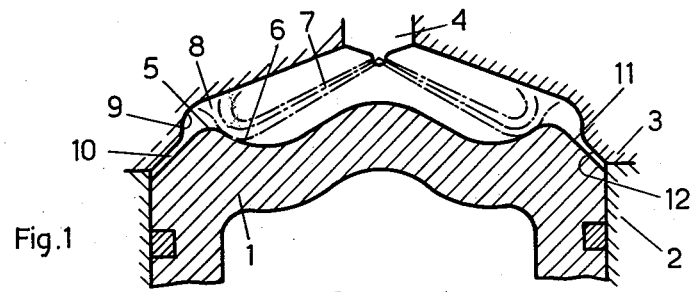
Figure 2:
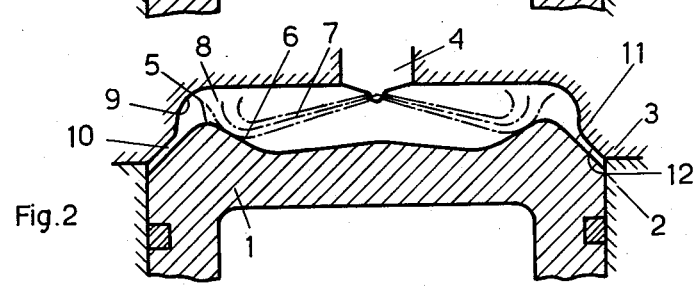
Figure 3:
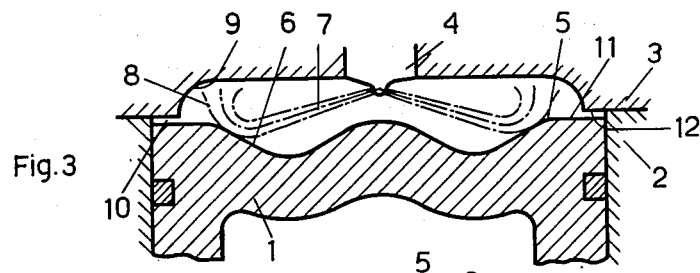
Figure 4:
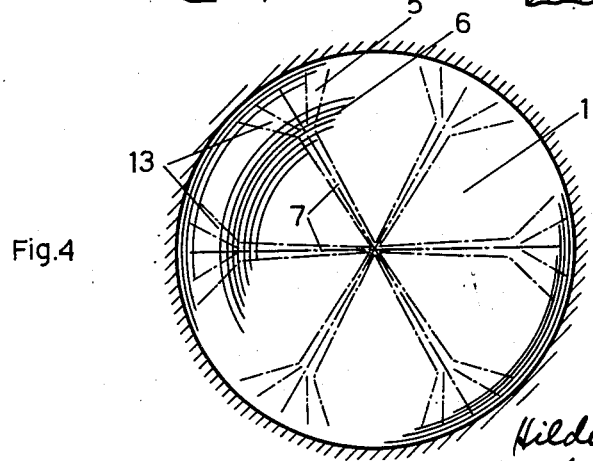
Figure 5:
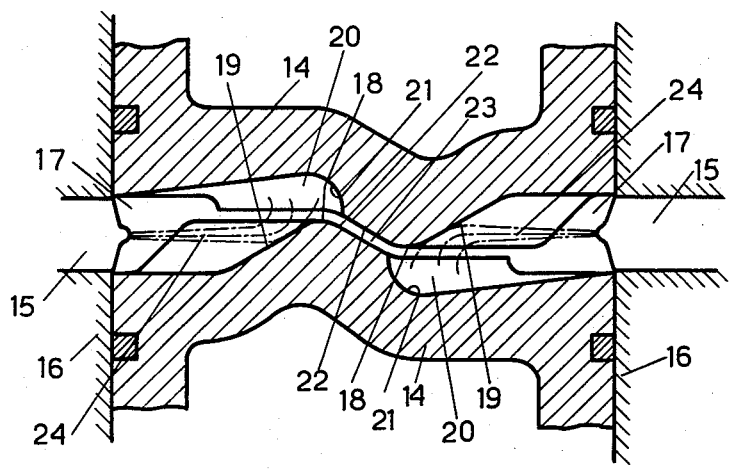

In the accompanying drawings some embodiments of compression chambers for two- and four-stroke cycle engines according to the invention are illustrated by way of example. Figs. 1 and 2 are axial sections of the compression chamber of two different embodiments of two-stroke cycle engines according to the invention provided with open combustion chamber. Fig. 3 is an axial section of the compression chamber of a four-stroke cycle engine with open combustion chamber. Fig. 4 illustrates the compression chambers according to Figs. 1–3 as viewed towards the piston and indicates diagrammatically the paths of the fuel jets through the compression chambers. Fig. 5 illustrates the compression chambers of an opposed piston engine, and Fig. 6 illustrates the compression chambers according to Fig. 5 as viewed in the direction towards the lower piston, the paths of the fuel jets through the compression chambers being illustrated diagrammatically.

In the embodiments according to Figs. 1–4 1 designates the top of an engine piston, 2 the cylinder wall, 3 the cylinder head, and 4 a fuel injection valve which in all these cases is disposed centrally. The top 1 of the piston has an annular ridge extending at a distance from the periphery of the piston and having an arcuate side or deflection wall 6 inclined relative to the cylinder axis at such an angle that fuel jets 7 from the fuel injection valve 4 directed towards said wall are deflected by said wall with an outward inclination. The deflected fuel jets consequently cross an annular space 8 which in top position of the piston is defined by an annular cavity 9 in the cylinder head and the ridge 5 formed at the top of the deflecting wall 6 and defined between wall 6 and the outer surface 11 of the piston head, and which space when the piston approaches top position is crossed by air streams expelled from a slot 10 which when the piston approaches top position is formed between an outer surface 11 of the ridge 5 and an annular surface 12 on the cylinder head. In the embodiments according to Figs. 1 and 2 the outer surfaces 11 forming the ridge 5 are inclined relative to the cylinder axis, since in this case the pistons are intended for two-stroke cycle engines with piston controlled scavenging openings in which engines said inclined surfaces 11 contribute to guiding of the scavenging air during its passage from the scavening openings into the cylinder. According to Fig. 3, however, the surface 11 is perpendicular to the cylinder axis, since the embodiment illustrated in Fig. 3 is intended for four-stroke cycle engines. Fig. 4 indicates that the fuel jets after having struck the inner deflecting wall 6 of the ridge 5 are spread out peripherally as at 13, and that they consequently to a high degree get into contact with and mix thoroughly with the main portion of the air in the compression chamber of the engine which is gathered in the annular space 8.

Figure 6:
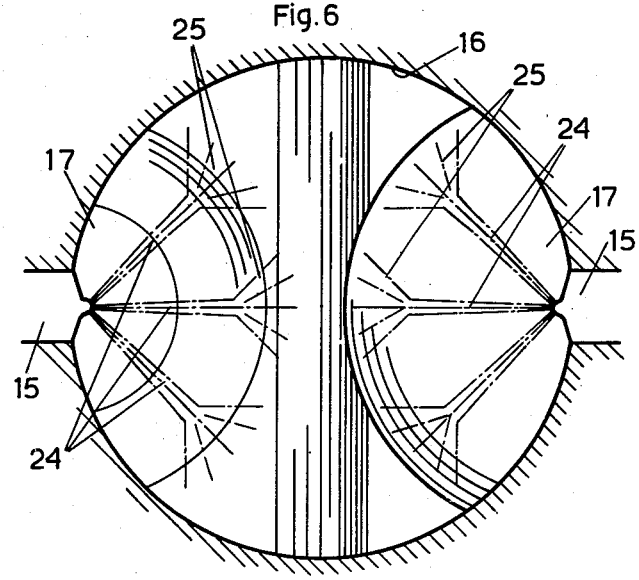

Figs. 5 and 6 illustrate the application of the invention on an opposed piston engine. Said engine is provided with opposed motion pistons of the same size, the tops of which are indicated by 14. Fuel injection valves 15 are in this case provided at two diametrically opposed points and inject fuel in the two compression chambers 17 in a plane perpendicular to the cylinder axis. Each piston top 14 is in this case provided with a ridge 18 extending diametrically over the piston and defined at one side by an arcuate inclined deflecting wall 19 against which the fuel jets 24 from one of the fuel injection valves 15 are directed. The ridge 18 extends arcuately in such a manner that all jets 24 from the fuel injection valve have substantially the same distance to pass before they reach the inclined wall 19 from which they are reflected through a space 20 formed between the wall 19 and an arcuate cavity 21 in the opposed piston top. The ridges 18 are respectively defined between the deflecting wall 19 and one of the further surfaces 22, the latter surfaces when the pistons approach each other forming a narrow slot 23 from which air is expelled right through the spaces 20 and then crosses the fuel jets 25 deflected by the walls 19 through the space 20 so that a thorough mixture is obtained. Also in the embodiment according to Figs. 5 and 6 the fuel jets 24 are spread out when they strike the wall 19 as indicated diagrammatically at 25 in Fig. 6, and the fuel is consequently evenly distributed throughout the main portion of the air mass compressed in the compression chambers.

The embodiments of the invention above described and illustrated in the drawings should only be considered as examples and the details of the invention may be modified in several different ways within the scope of the claims.

What I claim is:

1. In an internal combustion engine, a cylinder, a piston reciprocable in said cylinder, a part opposed to said piston, an open main compression and combustion chamber in the cylinder formed between the piston and an opposing surface merging into a curved annular surface on said opposed part, an arcuate deflection wall on the head of the piston, means for injecting fuel in the cylinder towards said deflection wall at an oblique angle, a further surface on the piston, a surface on the opposed part extending radially outwardly from said curved annular surface and arranged so as to form together with said further surface on the piston a narrow slot when the piston is at the compression end of its stroke, said slot being disposed beyond the deflection wall as viewed in the direction of the fuel injection in such a manner that the imaginary extension of the slot along which air is expelled from the slot into said chamber extends over the deflection wall, an arcuate ridge or crest on the piston head defined at one side by said further surface on the piston and on the other side by said deflection wall, said curved annular surface being entirely disposed radially outwardly of said ridge or crest and a cavity in said opposed part extending beyond said ridge or crest as viewed from said fuel injection means to provide a space forming a portion of said chamber located on the side of said imaginary extension of the slot remote from the fuel injecting means through which deflected fuel particles are thrown in fan shape when the fuel jets hit said arcuate deflection wall, said deflected fuel particles impinging on the opposing surface of said opposed part radially inwardly of said curved annular surface.

2. In an internal combustion engine, a cylinder, a piston reciprocable in said cylinder, a part opposed to said piston, an open main compression and combustion chamber in the cylinder formed between the piston and an opposing surface merging into a curved, annular surface on said opposed part, a deflection wall on the head of the piston extending along an arc having a centre, means substantially at said centre for injecting fuel in the cylinder towards said deflection wall at an oblique angle, a further surface on the piston, a surface on the opposed part extending radially outwardly from said curved annular surface and arranged so as to form together with said further surface on the piston a narrow slot when the piston is at the compression end of its stroke, said slot being disposed beyond the deflection wall as viewed in the direction of the fuel injection in such a manner that air expelled from the slot into said chamber at the compression end of the piston stroke is projected transversely past the edge of the deflection wall, an arcuate ridge or crest on the piston head defined at one side by said further surface on the piston and on the other side by said deflection wall, said curved annular surface being entirely disposed radially outwardly of said ridge or crest and a cavity in said opposed part extending beyond said ridge or crest as viewed from said fuel injection means to provide a space forming a portion of said chamber located on the side of said ridge or crest remote from said fuel injecting means through which deflected fuel particles are thrown in fan shape when the fuel jets hit said arcuate deflection wall, said deflected fuel particles impinging on the opposing surface of said opposed part radially inwardly of said curved annular surface.

3. In an internal combustion engine, a cylinder, a piston reciprocable in said cylinder, a cylinder head opposed to said piston, an open main compression and combustion chamber in the cylinder formed between the piston and an opposing surface merging into a curved annular surface on said cylinder head, an annular deflection wall on the head of the piston having a centre on the cylinder axis, means in the cylinder head substantially on the cylinder axis for injecting fuel in the cylinder towards said deflection wall at an oblique angle, a peripheral annular surface on the piston, an annular surface on the cylinder head extending radially outwardly from said curved annular surface and arranged so as to form together with said peripheral annular surface on the piston a narrow peripheral annular slot when the piston is at the compression end of its stroke, said slot being disposed peripherally outside the annular deflection wall in such a manner that air expelled from the slot into said chamber at the compression end of the piston stroke is projected transversely past the edge of the deflection wall, an annular ridge or crest on the piston head defined on one side by the peripheral annular surface on the piston and on the other side by the annular deflection wall, and an annular cavity in the cylinder head extending radially, said curved annular surface being entirely disposed radially outwardly of said ridge or crest outside said ridge or crest to provide a space forming a portion of said chamber located outside said ridge or crest through which deflected fuel particles are thrown in fan shape when the fuel jets hit said annular deflection wall, said deflected fuel particles impinging on the opposing surface of said opposed part radially inwardly of said curved annular surface.

4. In an internal combustion engine, a cylinder, a piston reciprocable in said cylinder, a part opposed to said piston, an open main compression and combustion chamber in the cylinder formed between the piston and said opposed part, a deflection wall on the head of the piston extending along an arc having a centre disposed substantially at the periphery of the cylinder, means substantially at said centre for injecting fuel in the cylinder towards said deflection wall at an oblique angle, a further surface on the piston, a surface on said opposed part arranged so as to form together with said further surface on the piston a narrow slot when the piston is at the compression end of its stroke, said slot being disposed beyond the deflection wall as viewed in the direction of the fuel injection in such a manner that air expelled from the slot into said chamber at the compression end of the piston stroke is projected transversely past the edge of the deflection wall, a ridge or crest on the piston head defined at one side by said further surface on the piston and on the other side by said deflection wall, and a cavity in said opposed part extending along an arc having its centre at the periphery of the cylinder where said injection means is disposed and having a larger maximum radius than said arcuate deflection wall to provide a space forming a portion of said chamber located on the side of said ridge or crest remote from said fuel injecting means through which deflected fuel particles are thrown in fan shape when the fuel jets hit said arcuate deflection wall.

5. An internal combustion engine as defined in claim 4, in which said opposed part of the engine consists of an opposed motion piston reciprocable in the cylinder.

6. An internal combustion engine as defined in claim 5, in which the opposed motion pistons are alike and are each provided with at least one ridge in a portion of the piston head and a cavity in another portion disposed in such a manner that ridges and cavities in the two opposed motion pistons fit each other in pairs.

7. An internal combustion engine, a cylinder, a piston reciprocable in said cylinder, another engine part having an opposed surface merging into a curved annular surface confronting the head of said piston to provide an open main compression and combustion chamber in the cylinder, an arcuate annular deflection wall formed on said piston head and inclined with respect to the axis of the cylinder, an injection nozzle located on the axis of the cylinder and having apertures located to direct jets of fuel to impinge against said wall at an obtuse angle with respect to the plane of said wall whereby to cause the fuel from the jets to be spread laterally in fan like form and deflected obliquely toward said other part, said piston having a further annular wall on the side of said deflection wall remote from said injector, said further annular wall being obliquely inclined at substantially right angles to said deflection wall to form a ridge between said walls, and said other part having a complementary wall extending radially outwardly from said curved annular surface and confronting said further wall and so located that the last mentioned walls form between them a slot when the piston is at the inner end of its stroke for expelling a high velocity stream of air transversely across the deflected fuel, said curved annular surface being entirely disposed radially outwardly of said ridge to provide a cavity forming a portion of said chamber located radially outwardly of said ridge, said deflected fuel impinging on the opposed surface of said other part radially inwardly of said curved annular surface.

8. In an internal combustion engine, a cylinder, a piston reciprocable in said cylinder, an opposed piston reciprocable in said cylinder and confronting the head of said first piston to provide an open main compression and combustion chamber in the cylinder, each of said pistons having an arcuate deflection wall with a centre located approximately at the periphery of the piston, an injection nozzle having apertures located to direct jets of fuel to impact against said deflection walls at an obtuse angle with respect to the planes of said walls whereby to cause the fuel from the jets to be spread laterally in fan like form and deflected obliquely toward said opposed pistons, each of said pistons having a recess to provide a space forming a portion of said chamber located further from said nozzle than said deflection walls and into which the deflected fuel is directed and each of said pistons having an obliquely inclined wall between the deflection wall and the recess, the last mentioned inclined walls confronting to form a slot for projecting air into the spaces provided by the recesses in said pistons and transversely across the deflected fuel entering said spaces.

References Cited in the file of this patent

UNITED STATES PATENTS

| Number | Name | Date |
|---|---|---|
| 1,207,799 | Scheller | Dec. 12, 1916 |
| 1,496,278 | Schneider | June 3, 1924 |
| 1,523,453 | Scott | Jan. 20, 1925 |
| 1,703,653 | Barrett | Feb. 26, 1929 |
| 2,001,358 | Guernsey | May 14, 1935 |
| 2,349,305 | Pyk | May 23, 1944 |
| 2,440,310 | Thege | Apr. 27, 1948 |

FOREIGN PATENTS

| Number | Country | Date |
|---|---|---|
| 77,361 | Austria | July 25, 1919 |
| 650,185 | Germany | Sept. 13, 1937 |
| 848,994 | France | Aug. 7, 1939 |
| 531,366 | Great Britain | Jan. 2, 1941 |